June 25, 1935.  B. WELLER  2,006,122
WINDSHIELD DEFROSTING DEVICE
Filed Feb. 16, 1935  2 Sheets-Sheet 1

Inventor
Ben Weller,

By Clarence A. O'Brien
Attorney

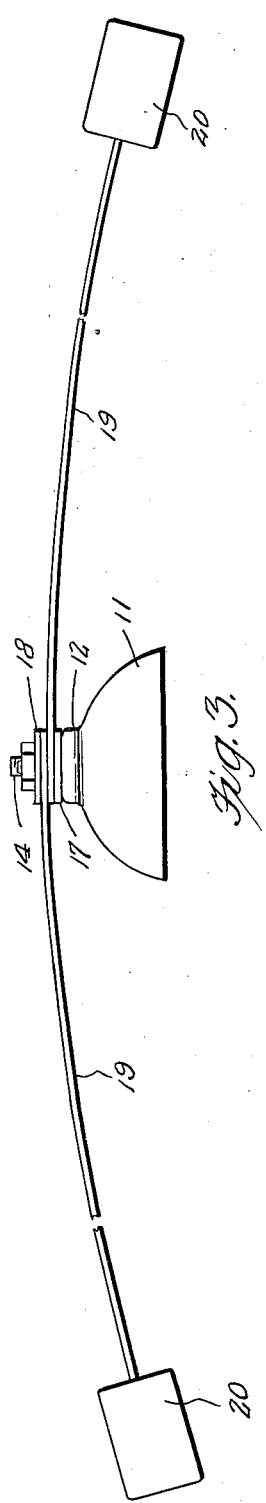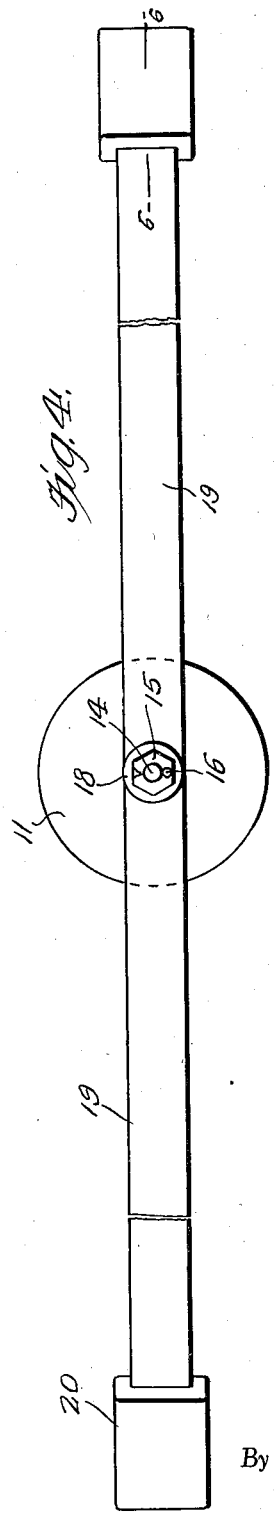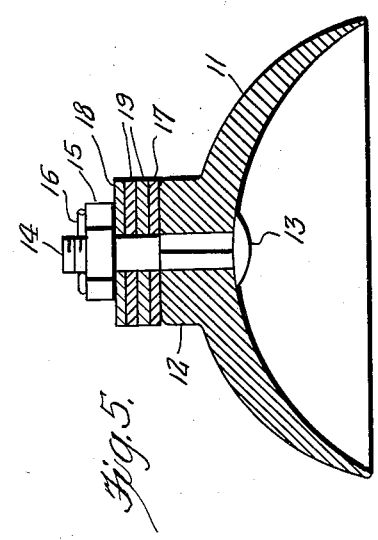

Patented June 25, 1935

2,006,122

UNITED STATES PATENT OFFICE 2,006,122

WINDSHIELD DEFROSTING DEVICE

Ben Weller, Midwest, Wyo.

Application February 16, 1935, Serial No. 6,861

8 Claims. (Cl. 20—40.5)

This invention relates to a unique automotive appliance or attachment conceived and especially designed to cooperate with certain existing parts of a conventional automobile in a manner to function as a novel windshield defrosting means.

It has been discovered that the warm air current from the engine of an automobile while in operation may be used for many comforting purposes. More recently, however, it has been found that much of the otherwise wasted heated air-waves may be satisfactorily utilized for warming the windshield to a degree sufficient to melt ice deposits and to otherwise free the outer surface of the windshield of frost. It follows, therefore, that mechanical devices have been perfected to simply raise or elevate a portion of the inner end of the automobile hood to provide a vent through which the warm air current may pass in order to impinge against the windshield for defrosting purposes.

The foregoing idea of course, is not broadly new. The present invention, therefore, relates to an improved attachment susceptible of connection with the hood or the cowling for the purpose of forming this warm air defrosting vent. In the belief that I have evolved and produced a more simple and economical device for this purpose, I would state, by way of introduction, that in accordance with my conception I have perfected a satisfactorily usable device susceptible of fulfilling the requirements of the trade in a safe and dependable manner with a view toward promoting safer and reliable driving during cold weather spells.

Comprehended broadly and briefly, the improvement constituting the novelty herein introduced comprises one or more cushioning elements adapted for disposition between the hood and cowl in such a manner as to bow or flare the hood upwardly a distance sufficient to define this defrosting vent, said elements being permanently or detachably applied to either the cowl or the underside of the hood as desired.

Other and more specific features of the construction will become more readily apparent from the following description and drawings.

In the accompanying illustrative drawings wherein like numerals are employed to designate like parts throughout the views:

Figure 3 is an elevational view of the complete attachment or device.

Figure 4 is a top plan view of Figure 3.

Figure 5 is a cross sectional view through the central portion of the device.

Figure 6 is a longitudinal detail section taken on the plane of the line 6—6 of Figure 4.

Figure 1:
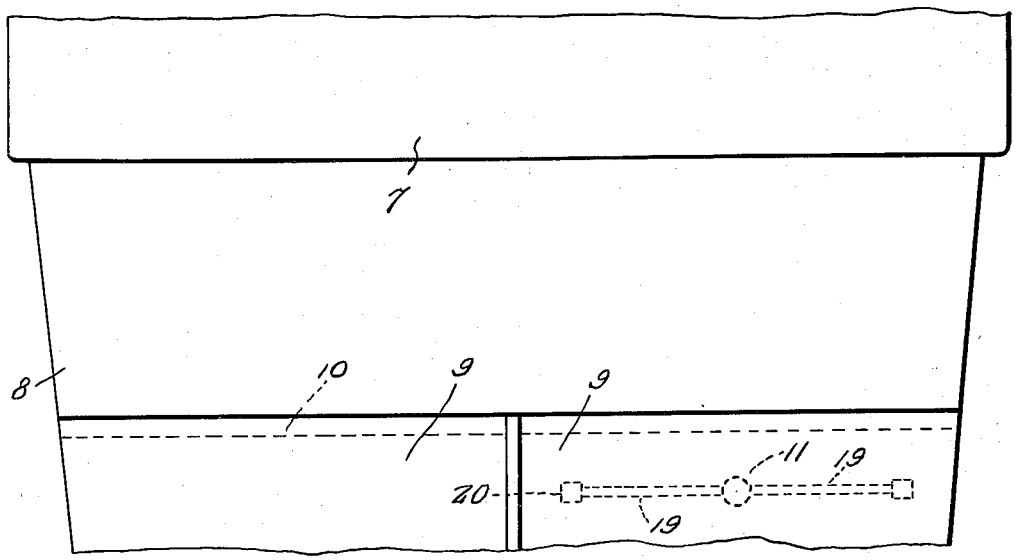
Figure 1 is a fragmentary top plan view of the cowl and hood in relation to the body showing the approximate disposition of the improved device and illustrating the way in which the parts are maintained in an out-of-the-way ineffective position.
Figure 2:
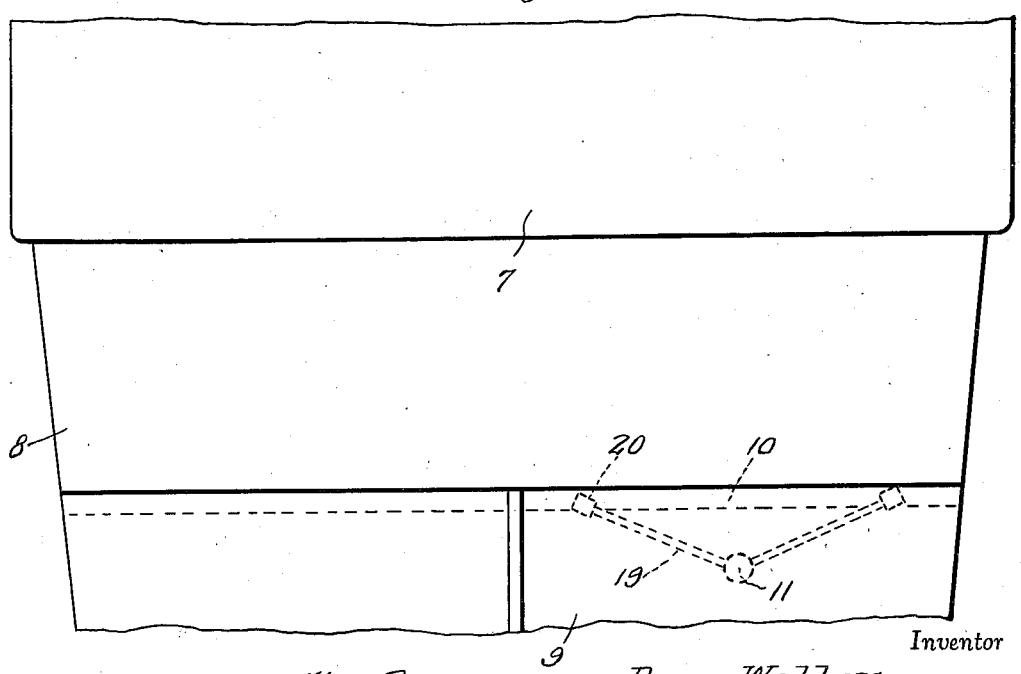
Figure 2 is a view like Figure 1 showing how the device is used in practice.

In the drawings in Figures 1 and 2 the body of the automobile or car is denoted by the numeral 7, the cowl is indicated at 8 and the complemental hinged sections of the hood are denoted by the numerals 9. The numeral 10 is utilized to designate the flange or ledge on which the inner ends of the hood sections rest. This is usually covered by felt or some such similar packing means. As before stated, the improved defrosting attachment is applicable either to the underside of one of the hood sections or it can be applied to the exterior of the cowl. Moreover, it is permissible to employ either one or two of these hood lifting or venting devices. Referring now to the attachment as shown in Figures 3 to 6 inclusive, I first call attention to the adapter or attaching means. Specifically, this is in the form of a rubber suction cup 11 of appropriate proportion. It is provided with an upstanding boss 12 and is centrally bored to accommodate the retention bolt 13. The square shank portion of the bolt passes through a correspondingly shaped passage in the bore and the threaded end of the bolt 14 carries a retaining nut 15 held against displacement by a cotter key or the like 16. This assemblage of parts includes inner and outer wear washers 17 and 18. Located between these washers in overlapping relation are flat spring arms 19. These arms are of duplicate form and of appropriate proportion. They are sufficiently flexible and preferably of longitudinally bowed form to serve as bow springs to hold the rubber cushioning elements or heads 20 in place. These elements 20 may be in the form of simple rectangular blocks fastened in a suitable manner on the outer end of the arms. That is, they may be riveted or welded or otherwise securely mounted on said arms. In practice, that is, when in use, as shown in Figure 2, these blocks serve as risers or spacing members at which time they are interposed between the ledge 10 and the adjacent overlying edge portion of the complemental hood sections. Broadly, then, we have an attaching device or adapter 11 with a pair of swingable arms 19 hingedly attached thereto at their inner ends, said arms being preferably disposed in overlapping relation and provided on their outer ends with heads or equivalent devices 20. The heads can be swung to an out-of-the-way position when not in use as shown in Figure 1, or they can be swung into operating position as shown in Figure 2, at which time the arms are in somewhat diverging relationship.

In practice, it is advisable to clean the attaching surface of the underside of the hood with gasoline and to allow it to dry. Then, the suction cup 11 is moistened with water and stuck in place at the desired point. If it is desired to attach the cup more or less permanently, it can be glued in place or attached by shellac. When not in use, the arms may be swung to the out-of-the-way position shown in Figure 1 at which time the spring arms 19 serve to maintain the rubber heads 20 in anti-rattling contact with the underside of the hood. When in use, the arms are swung to diverging position to locate the heads between the hood and the cowl, this being sufficient to elevate or bow the inner end of the hood to allow the warm air to escape between it and the cowl. The cowl serves to deflect the warm air currents against the windshield and this warms the windshield sufficiently to prevent the accumulation of frozen condensation, or to remove accumulated ice as the case may be. In either position, the arms 19 serve to maintain the blocks or heads 20 in more or less anti-slipping and anti-rattling position.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. An attachment of the class described comprising a spacing element, a carrier arm attached thereto, and a rubber suction cup at the inner end of said arm for fastening it in place.

2. An attachment of the class described comprising a spacing element, a carrier arm attached thereto, a rubber suction cup at the inner end of the said arm for fastening it in place, said arm being in the form of an elongated flat flexible spring.

3. A device of the class described comprising a rubber suction cup, a pair of longitudinally bowed spring arms attached at their inner ends to said cup, and rubber heads fastened to the outer ends of said arms in the manner and for the purposes described.

4. In a structure of the class described in combination, an automobile windshield, a cowl, a hood structure, a spacing element removably insertable between the hood and the cowl for the purpose of forming a hot air vent between said hood and cowl, an arm attached to said spacing element, and means for separably joining the outer end of the arm to the hood, whereby to permit said spacing element to be swung in and out of place.

5. In a structural assemblage of the class described, in combination, an automobile including a windshield, a cowl, a hood structure, a rubber block-like spacing member interposed between the hood and the cowl in such a way as to elevate the hood to form a vent between the hood and cowl, a flexible arm attached at its inner end to said spacing member, and means for attaching the outer end of the arm pivotally to the hood so as to allow the arm to pivot and to permit the spacing member to be swung into position between the hood and cowl when in use or swung to an out-of-the-way position beneath the hood when not in use and to hold said member yieldably in the last named position to avoid rattling.

6. An attachment of the class described, comprising a spacing element adapted for disposition between a hood and cowl in the manner described, a carrier and the retaining arm attached at one end to said element, and quick detachable mounting means secured to the opposite end of said arm, said means having the adjacent end of the arm pivotally connected thereto.

7. An attachment of the class described, comprising a spacing element adapted for disposition between a hood and cowl in the manner described, a carrier and the retaining arm attached at one end to said element, and quick detachable mounting means secured to the opposite end of said arm, said means having the adjacent end of the arm pivotally connected thereto, said arm being in the form of a flexible metal spring of sufficient inherent resiliency to hold the spacing element in yieldable contact with the hood when said element is swung from its operative position to an out-of-the-way non-usable position.

8. A duplex attachment of the class described comprising a pair of duplicate longitudinally bowed spring arms, spacing heads secured to the arms at one end and adapted to be located between a hood and cowl to form a vent in the manner described, and attaching and retaining means secured to the opposite ends of said arms in a manner to permit the arms to be pivoted or swung with respect thereto for the purposes described.

BEN WELLER.